United States Patent [19]
Gebeke et al.

[11] Patent Number: 5,421,531
[45] Date of Patent: Jun. 6, 1995

[54] SLACK LIMITER POST

[75] Inventors: Charles D. Gebeke, White Bear Lake; Gregory H. Johnson, Oakdale, both of Minn.

[73] Assignee: Minnesota Mining and Manufacturing Company, St. Paul, Minn.

[21] Appl. No.: 904,884

[22] Filed: Jun. 25, 1992

Related U.S. Application Data

[63] Continuation of Ser. No. 727,477, Jul. 9, 1991, abandoned.

[51] Int. Cl.⁶ ............... B65H 23/26; G11B 23/07; G11B 23/087
[52] U.S. Cl. .................... 242/346; 242/348; 242/566; 242/615; 226/196; 360/132
[58] Field of Search ........... 242/199, 197, 76, 346, 242/347, 347.2, 348, 348.3, 326.4, 377, 397, 548, 566, 615; 226/196; 360/132; 352/78 R

[56] References Cited

U.S. PATENT DOCUMENTS

| | | | |
|---|---|---|---|
| 3,558,142 | 1/1971 | Poessel | 242/347 |
| 3,691,921 | 9/1972 | Isbell | 242/338 X |
| 3,831,882 | 8/1974 | Fitterer et al. | 242/346 |
| 3,991,956 | 11/1976 | Machida | 242/346.2 |
| 4,011,592 | 3/1977 | Kawada | 242/335 X |
| 4,054,252 | 10/1977 | Oishi et al. | 242/346.2 |
| 4,114,833 | 9/1978 | Liepold | 242/346 |
| 4,382,565 | 5/1983 | Shiba | 226/196 X |
| 4,405,097 | 9/1983 | Gebeke | 242/343.1 |
| 4,452,408 | 6/1984 | Sasaki | 242/345.3 |
| 4,518,135 | 5/1985 | Gebeke | 242/343.1 |
| 4,569,492 | 2/1986 | Gelardi et al. | 242/343.1 |
| 4,575,023 | 3/1986 | Komiyama et al. | 242/343.1 |
| 4,598,329 | 7/1986 | Nelson | 360/130.21 |
| 4,639,967 | 2/1987 | Bordignon | 15/256.5 |
| 4,646,188 | 2/1987 | Kato et al. | 242/346 |
| 4,706,148 | 11/1987 | Komiyama et al. | 242/346 |
| 4,773,615 | 9/1988 | Carroll | 242/343.1 |
| 4,813,628 | 3/1989 | Tollefson | 242/343.1 |
| 4,817,881 | 4/1989 | Nakai et al. | 242/326.4 |
| 5,092,536 | 3/1992 | Gelardi et al. | 242/343 |

FOREIGN PATENT DOCUMENTS 7810894 4/1979 Netherlands .
0096994 12/1983 United Kingdom .

*Primary Examiner*—John Q. Nguyen
*Attorney, Agent, or Firm*—Gary L. Griswold; Walter N. Kirn; Charles D. Levine

[57] ABSTRACT

A tape cassette includes a base and a cover. A supply reel and a take-up reel are rotatably mounted in the base, and tape is wound around the reels and extends around a guide pin and across a tape path. A slack limiter includes a post mounted in the housing spaced from the guide pin. The post creates a gap through which the tape passes. When the supply reel is not driven, the post prevents the tape from spilling out of the cassette.

7 Claims, 2 Drawing Sheets

SLACK LIMITER POST

This is a continuation of Application No. 07/727/477 filed Jul. 9, 1991, now abandoned.

TECHNICAL FIELD

The present invention relates to magnetic tape cassettes. More particularly, the present invention relates to a slack limiter for magnetic tape cassettes which limits looseness in the tape and prevents the tape from spilling out of the cassette.

BACKGROUND OF THE INVENTION

Audio and video magnetic tape cassettes typically include two reels mounted within a housing with a length of magnetic tape wound around the two reels and extending between the reels across an access opening. Slack or looseness in the tape between the reels can arise when the cassette is transported or is separated from its associated recording and/or reproducing device, commonly called a recorder. While some cassettes have locks which restrict rotation of the reels when the cassette is not in the recorder, it is still possible for one or both of the reels within the cassette housing to turn to unwind the tape and develop slack in the portion of the tape extending between the reels. Slack in the tape can also occur when the tape is engaged with the recorder if driving and braking the reels during the operation of the recorder is not performed synchronously and at the same rate. This slack may cause the tape to jam within the cassette housing or within the recorder and can lead to defective recording or playing operations.

Slack limiters for avoiding slack in the tape are described in numerous patents. U.S. Pat. No. 4,813,628 to Tollefson discloses a tubular slack limiter. U.S. Pat. Nos. 4,773,615 to Carroll, 4,639,967 to Bordignon, 4,598,329 to Nelson, 4,569,492 to Gelardi et al., 4,518,135 to Gebeke, 4,405,097 to Gebeke, and 4,382,565 to Shiba all disclose slack limiters having a generally common configuration. These slack limiters include a resilient, flexible strip which is generally made of a plastic material. The strip is fixed at one end to the cassette housing and has a free end which can be coated with a layer of low friction material such as polytetrafluoroethylene and which contacts the tape.

All of these slack limiters operate by pressing the tape against a stationary portion of the cassette housing, such as a guide pin, and frictionally preventing the tape from unwinding from the reel and developing slack. These slack limiters are also known as wiper tabs and contact and provide a force on the tape. However, this contact scratches and wears the tape surface and can cause dropouts or signal losses on areas of the tape. To provide the required force on the tape, these slack limiters must have resilient portions. As the materials used for cassette housings do not exhibit the requisite properties, the slack limiters must be formed from materials other than the material of the cassette housing itself. Thus, the pressure-applying slack limiter cannot be molded directly into the cassette housing and must be attached as a separate part after forming the housing. One attachment method involves engaging a notch of the slack limiter with a projection on the housing. Other methods involve a housing receptacle receiving and holding a mounting portion of the slack limiter, or simply holding the slack limiter by adhesive or friction.

These slack limiters have numerous cost and manufacturing disadvantages. The slack limiters cost $3.00 to $5.00 per thousand. In cassettes where a savings of tenths of one cent per cassette is significant, this material cost is large. Also, assembling the slack limiters in the cassette adds a manufacturing cost. The slack limiters are typically placed in the cassette from large rolls from which the slack limiters are cut. The rolls must be discarded or recycled. The winds of the slack limiters on the roll are separated by a liner layer which must be discarded, thereby adding waste. Moreover, to the extent the cassettes are recycled after their useful life, the slack limiter adds an additional component of a different material from the rest of the cassette which must be sorted out, thereby increasing recycling costs. Additionally, when the roll is empty, the production line on which the cassettes are made must be shut down to permit replacement of the roll. This down time further increases manufacturing costs.

SUMMARY OF THE INVENTION

The present invention is a slack limiter for use in a tape cassette which improves on existing slack limiter designs and overcomes their disadvantages. The slack limiter is formed as an integral, one piece member of the cassette housing, molded together with the remainder of the housing. This eliminates the $3.00 to $5.00 per thousand cost as the cost of the additional material for the housing is practically zero. The time and cost associated with assembling the slack limiters into the cassette and the related down time is eliminated. The waste associated with the rolls or liner layer and the added recycling costs also are eliminated.

The cassette includes a housing which is formed of a base and a cover. The housing has an access opening, a supply reel and a take-up reel rotatably mounted within the housing, and a length of tape having ends wound around respective reels and extending across an access opening for movement along a tape path. A cylindrical guide pin is mounted in the housing adjacent the supply reel and the tape passes around the guide pin as part of the normal tape path. The slack limiter is a cylindrical post mounted in the housing adjacent and spaced from the guide pin. The post creates a gap through which the tape passes. During normal operation of the tape cassette, the supply reel is driven and the tape does not contact the post. This reduces tape wear. When the supply reel is not driven, the post prevents the tape from spilling out of the cassette by setting the gap distance.

DETAILED DESCRIPTION OF PREFERRED EMBODIMENTS

Figure 1:
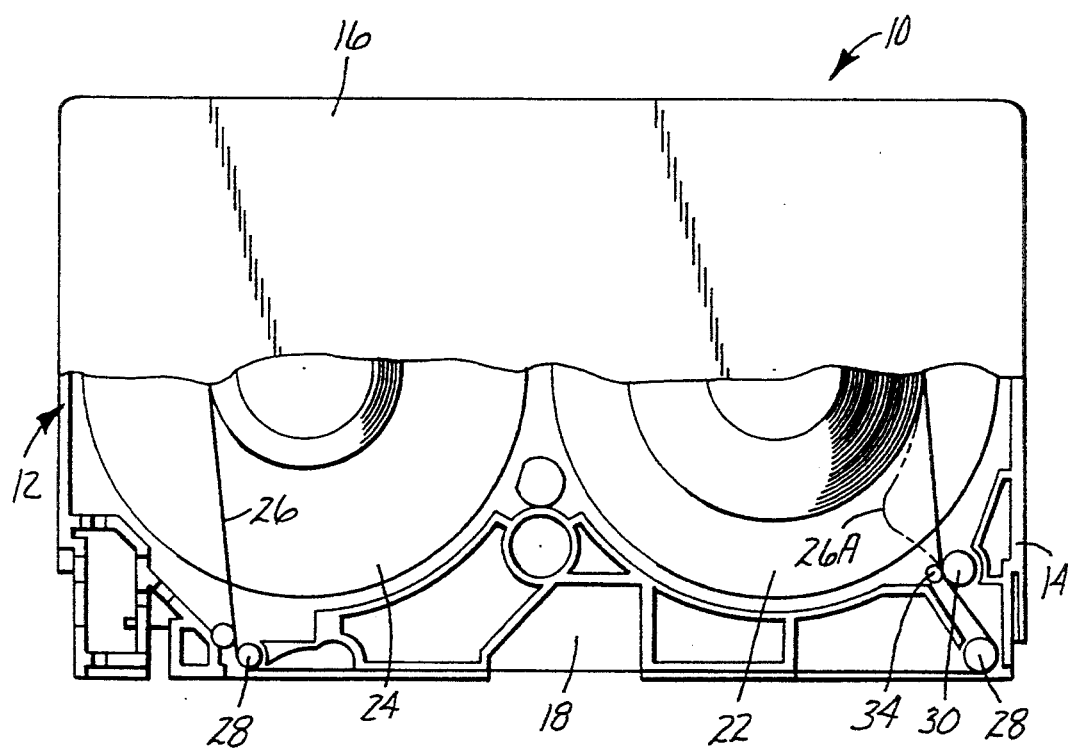
FIG. 1 is a plan view of a cassette base showing the slack limiter and having parts broken away to show details.

Referring to FIG. 1, a magnetic video tape cassette 10 includes a housing 12 which is formed of a base 14 and a cover 16. The housing 12 has an access opening 18 at the front of the cassette which is closable by a door (not shown) when the cassette 10 is not in use. The door is pivoted open by a tape recorder in which the cassette 10 is mounted to access the tape 26 extending across the access opening 18. Two reels, a supply reel 22 and a takeup reel 24, are rotatably mounted within the housing 12, and a length of tape 26 is wound from reel to reel with one end wound around each reel. Three cylindrical guide pins 28, 30, which can include a sleeve, direct the tape 26 between the reels 22, 24 along the tape path to and across the access opening 18.

A slack limiter 34 is located in the housing as shown in FIG. 1 adjacent the supply reel 22 in an area that does not interfere with the light path or reel area. When the supply reel 22 unwinds more tape 26 than is immediately taken up by the takeup reel 24, a loop 26A of loose tape 26, shown in broken line in FIG. 1, forms. The slack limiter 34 contains this loop 26A within the housing 12 of the cassette 10.

Figure 2:
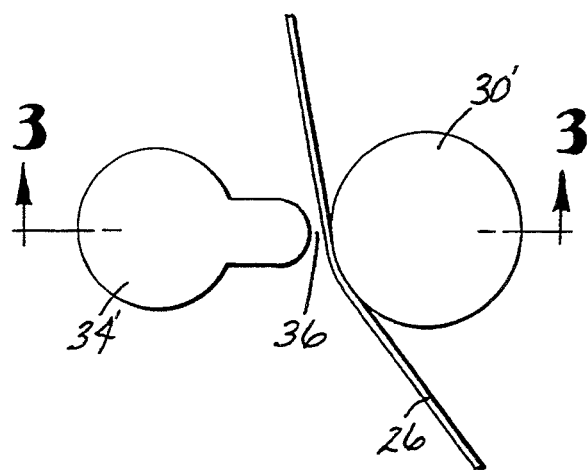
FIG. 2 is an enlarged partial plan view of the cassette of FIG. 1 showing the slack limiter according to another embodiment of the present invention.
Figure 3:
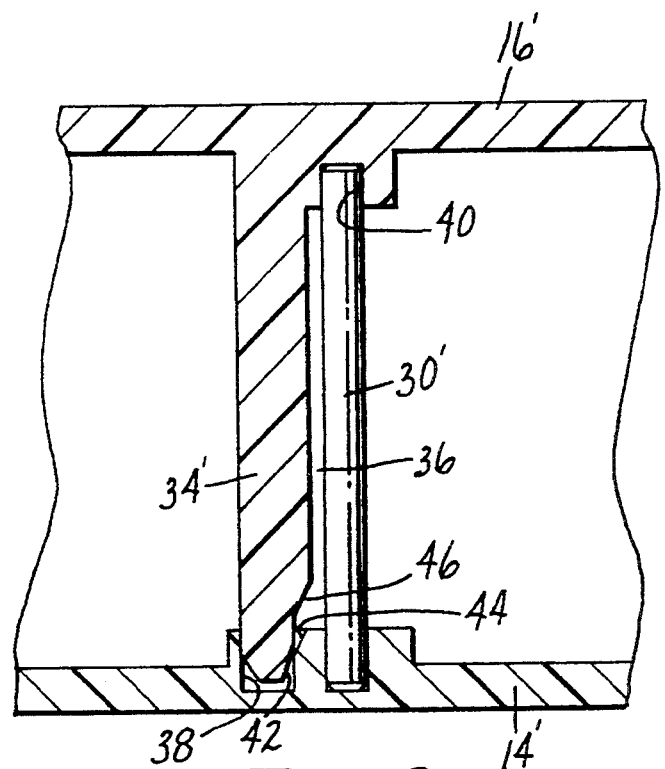
FIG. 3 is cross-sectional view of the slack limiter taken along line 3—3 of FIG. 2 with the cover in place and without tape.

Referring to FIG. 2, an alternative shape of the slack limiter is shown. The slack limiter 34' mounted in the housing 12 adjacent and spaced from the cylindrical guide pin 30' around which the tape 26 passes as part of the normal tape path. Preferably, the guide pin 30' is mounted in the base 14 and the slack limiter is mounted in the cover 16 of the housing, as shown in FIG. 3, although these locations can be reversed. The slack limiter 34' includes a cylindrical bar or post mounted in the cover 16. When the base 14 and cover 16 are closed to complete the housing 12, the slack limiter 34' is located adjacent and spaced from the guide pin 30'. The slack limiter 34' creates a gap 36 between the slack limiter 34' and the guide pin 30' through which the tape passes.

The distance of the gap 36 between the guide pin 30' and the slack limiter 34' can range from 130 to 380 microns, and preferably from 255 to 355 microns. While this distance is small when compared to the scale of the cassette 10, it is large when compared to the thickness of the tape 26 which is typically 20 microns and its leader which is 40 microns. Thus, this gap ranges from six to nineteen times, and preferably twelve to eighteen times the thickness of the tape 26. As the gap 36 is small with respect to the overall cassette dimensions, the slack limiter 34' must be carefully fabricated to maintain the gap distance within acceptable tolerances. It is preferred that the distance not differ by more than 100 microns across the width of the tape 26. It is also preferred to form the slack limiter 34' of sufficient rigidity that the gap distance will not be forced out of tolerance when the tape 26 contacts the slack limiter 34', although the tape 26 should never contact the slack limiter 34' with any significant force. Similarly, the edge of the slack limiter 34' facing the guide pin 30' should be sufficiently straight that when it contacts the tape 26 it does not cause the tape 26 to curl in the direction transverse to its direction of travel. This can be accomplished by rigidly locating both ends of the slack limiter 34' in the housing 12 during assembly.

During normal operation of the tape cassette 10, the supply reel 22 is driven and the tape 26 is held tightly against the guide pin 30 by the tension produced in the tape 26 by the tape drive mechanism of the recorder. The tape 26 passes through the gap 36 and does not contact the slack limiter 34. When supply reel 22 is not driven, the tape 26 can become loose and move away from the guide pin 30 and toward the slack limiter 34.

The presence of the slack limiter 34 separated from the guide pin 30 by the gap 36 is sufficient to prevent loops 26A of loose tape 26 from passing beyond the guide pin 30-slack limiter 34 combination. Thus, the slack limiter 34 prevents the tape 26 from spilling out of the access opening 18 or any other location along the front of the cassette 10, particularly near the guide pin 30.

Preferably, the slack limiter 34 is molded as an integral one-piece member with the housing 12. FIG. 1 illustrates the slack limiter 34 as being integrally molded as a one-piece member with the base 14. The slack limiter 34 is received in a boss (not shown) in the cover 16. FIG. 3 shows the slack limiter 34' being integrally molded as a one-piece member with the cover 16'. The slack limiter 34' extends from the cover 16' and is received in a boss 38 in the base 14' to connect the cover 16' and the base 14'. Preferably, the slack limiter 34' is formed with a chamfer 42 at its free end to compensate for mismatches due to part tolerances during the assembly of the slack limiter 34' in its boss 38. A chamfer 44 could also be formed on the boss 38. Additionally, another chamfer 46 can be formed on the slack limiter 34' to provide a smooth lead in for the leader and the tape 26 during automatic assembly.

Similarly, the guide pin 30', which is mounted or formed in the base 14' of the housing 12, can be received within a boss 40 formed in the cover 16'. This is best shown in FIG. 3. The connection of the cover 16 and base 14' via the guide pin 30' and slack limiter 34' connections with their respective bosses 40, 38 maintains the distance of the gap 36 within tolerance levels.

Figure 4:
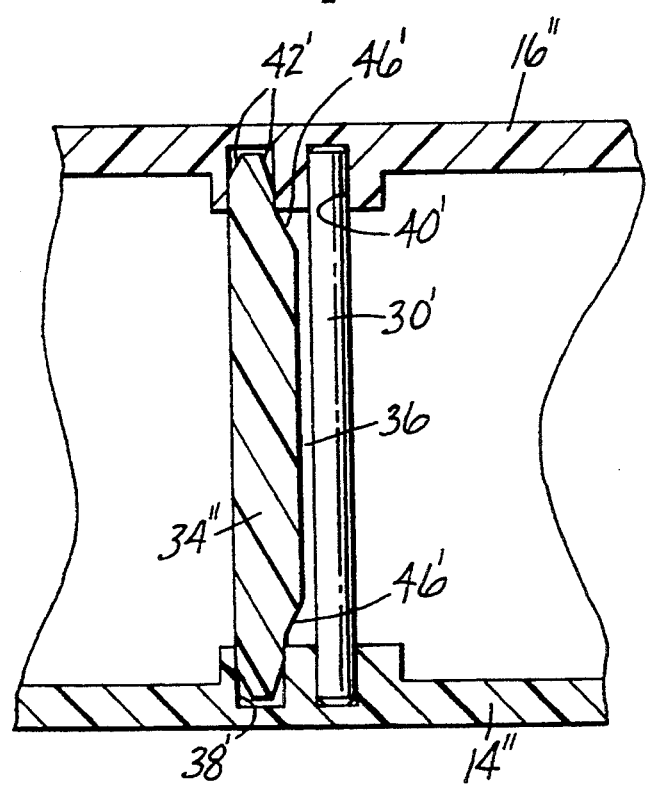
FIG. 4 is a cross-sectional view of the slack limiter according to another embodiment of the present invention.

Alternatively, the slack limiter 34' can be separately manufactured and then assembled into the cassette 10 as shown in FIG. 4. In still another embodiment (now shown), the slack limiter 34 can have portions molded with the base 14 and portions molded with the cover 16. In this version, special fabrication precautions are required to insure a smooth fit between the portions as the connection area would be contactable by the tape 26. Also, a locating part (not shown) can be installed between the guide pin 30 and the slack limiter 34 to maintain the distance of the gap 36 within acceptable tolerances.

The size and shape of the slack limiter 34 are not critical. The slack limiter 34 can be cylindrical and have a diameter that is larger or smaller than that of the guide pin 30. In FIG. 1 the slack limiter 34 is shown smaller than the guide pin 30. A smaller diameter reduces the chances of sink developing in the external side of the cover 16 due to shrinkage during cooling and after molding. A preferred shape for the slack limiter 34' has a better molding configuration and is shown in FIG. 2. This configuration provides a relatively large main body portion for strength and rigidity, particularly in the direction of the gap (between the slack limiter 34' and the guide pin 30), while providing a tape-contacting portion with a smaller radius than the main body portion. The smaller radius on the tape-contacting portion reduces any contact with the tape 26. The only restriction is that the slack limiter 34 does not subject the tape 26 to sharp or otherwise damaging edges or surfaces, and that it has sufficient size to provide the required mechanical strength without interfering with the other functions of the cassette. Increasing the size and strength of the slack limiter 34, reduces the chance of damage before assembly of the cover 16 and the base 14 of the housing 12.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention. For example, the slack limiter can be incorporated into all formats and types of tape cassettes, particularly those in which the tape is pulled out of the cassette during operation in a tape player.

We claim:

1. A slack limiter for use in a videotape cassette, wherein the cassette includes a housing, a supply reel rotatably mounted within the housing, a length of tape wound around the supply reel and extending for movement along a tape path, and a nonrotatable guide pin mounted in the housing adjacent the supply reel and around which the tape passes, wherein the slack limiter comprises:

a nonrotatable slack limiter post mountable in the housing adjacent and spaced from the guide pin for creating a gad through which the tape passes, wherein during normal operation of the tape cassette, the supply reel is driven and the tape does not contact the slack limiter post, and wherein when the supply reel is not driven, the slack limiter post prevents the tape from spilling out of the cassette, and wherein the distance between the guide pin and the slack limiter post ranges from 130 microns to 380 microns, 2. The slack limiter of claim 1 wherein the slack limiter post is molded integrally as one piece with one component of the housing.

3. The slack limiter of claim 1 wherein the distance between the guide pin and the slack limiter post ranges from six to nineteen times the thickness of the tape.

4. A videotape cassette comprising a housing having a supply reel rotatably mounted within the housing a length of tape wound around the reel and extending for movement along a tape path, a nonrotatable guide pin mounted in the housing adjacent the supply reel and around which the tape passes, and a nonrotatable slack limiter mounted in the housing adjacent and spaced from the guide pin for creating a gap through which the tape passes, wherein during normal operation of the tape cassette, the supply reel is driven and the tape does not contact the slack limiter, and wherein when the supply reel is not driven, the slack limiter prevents the tape from spilling out of the cassette, and wherein the distance between the guide pin and the slack limiter ranges from 130 microns to 380 microns.

5. The cassette of claim 4 wherein the slack limiter is molded integrally as one piece with one component of the housing.

6. The cassette of claim 4 wherein the distance between the guide pin and the slack limiter ranges from six to nineteen times the thickness of the tape.

7. The cassette of claim 4 wherein the slack limiter comprises a post.

* * * * *

UNITED STATES PATENT AND TRADEMARK OFFICE
CERTIFICATE OF CORRECTION

PATENT NO. : 5,421,531
DATED : June 6, 1995
INVENTOR(S) : Gebeke et al

It is certified that error appears in the above-indentified patent and that said Letters Patent is hereby corrected as shown below:

Column 1, line 4, "07/727/477" should read --07/727,477--.

Column 3, line 22, "34' mounted" should read --34' is mounted--.

Column 4, line 28, "16" should read --16'--.

Column 4, line 34, "now" should read --not--.

Column 5, line 24, "gad" should read --gap--.

Column 6, line 2, "," should read --.--.

Column 6, line 10, "housing" should read --housing,--.

Column 6, line 12, "pin-" should read --pin --.

Signed and Sealed this

Sixteenth Day of April, 1996

BRUCE LEHMAN

*Attest:*

*Attesting Officer*    Commissioner of Patents and Trademarks